(12) United States Patent
De Hoz Garcia-Bellido et al.

(10) Patent No.: US 6,324,401 B1
(45) Date of Patent: Nov. 27, 2001

(54) SOFT HANDOVER METHOD USED IN A CDMA MOBILE COMMUNICATION SYSTEM AND CORRESPONDING DEVICE

(75) Inventors: Alejandro De Hoz Garcia-Bellido, Boulogne; Christopher Cordier, Paris, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/356,458

(22) Filed: Jul. 19, 1999

(30) Foreign Application Priority Data

Apr. 30, 1999 (EP) .................................................. 99440098

(51) Int. Cl.⁷ ...................................................... H04Q 7/20
(52) U.S. Cl. ........................... 455/442; 455/522; 370/331
(58) Field of Search ........................... 455/522, 436–439, 455/442, 69–70, 561, 575, 524, 422; 370/331, 335, 342, 310

(56) References Cited

U.S. PATENT DOCUMENTS

| | | |
|---|---|---|
| 5,487,174 | 1/1996 | Persson . |
| 5,722,074 | 2/1998 | Muszynski . |
| 5,960,347 * | 9/1999 | Ozluturk .............................. 455/442 |
| 6,029,070 * | 2/2000 | Kingdon et al. ..................... 455/456 |
| 6,119,018 * | 9/2000 | Kondo .................................. 455/522 |

FOREIGN PATENT DOCUMENTS

| | | |
|---|---|---|
| 0 671 819 A2 | 9/1995 | (EP) . |
| 0 902 551 A2 | 3/1999 | (EP) . |

\* cited by examiner

*Primary Examiner*—Doris H. To
(74) *Attorney, Agent, or Firm*—Sughrue, Mion, Zinn, Macpeak & Seas, PLLC

(57) ABSTRACT

The invention concerns a method of selecting a base station of a CDMA type network with which a terminal is to perform a soft handover. According to the invention, the base station which requires the lowest transmission power on the part of the terminal is selected.

14 Claims, No Drawings

SOFT HANDOVER METHOD USED IN A CDMA MOBILE COMMUNICATION SYSTEM AND CORRESPONDING DEVICE

BACKGROUND OF THE INVENTION

The present invention relates to a soft handover method used in a CDMA mobile communication system.

In a cellular communication system, a mobile terminal is free to roam and connect from one base station to another within the mobile communication system. When a terminal is handling a call during a cell crossover, the call must also be switched to the new base station by a way which causes as little disturbance to the call as possible. The cell crossover process during an ongoing call is called a handover.

In a CDMA mobile communication system, a mobile terminal is able to communicate simultaneously with different base stations, these base stations being those registered in the active set of the mobile terminal. Each base station transmits data on a dedicated broadcast channel, e.g. on the broadcast channel called BCCH (Broadcast Control Channel) in the GSM system, this channel containing some information related notably to the load of this base station. The broadcast channels of the different base station of the CDMA system are sent with a same given power. Each mobile terminal of the network receives these different broadcast channels and demodulates them in order to determine a ratio Eb/I, where Eb is the energy level per bit received and I the spectral interference density (or Ec/I with Ec the energy level per chip) for each base station. This ratio corresponds to the quality with which the mobile terminal receives the broadcast channel of the corresponding base station. Alternatively, the received power level form the BCCH channel can be used as a quality criterion. The mobile terminal can therefore determine a signal quality level for each base station and can select the base stations that it receives with the best quality for soft handover purposes. This selection includes registering the best received base stations in its active set.

Such a process is performed on a regular time basis in order to ensure that the mobile terminal is always in communication with the best received base stations. Such communications with different base stations is called macrodiversity situation. This allows to lower the interference level of the system in comparison with a communication established with a single base station. Macrodiversity is also a means of improving signal quality for mobiles at cell border.

The goal of a soft handover criterion is to anticipate cell changes and detect potentially interesting macrodiversity situations. In this manner, interference is reduced in the network while maintaining quality.

Prior art solutions include downlink-oriented soft handover criteria. The mobile terminal carries out measurements (signal strength, Eb/I . . . ) over the downlink broadcast channel of each base station and compares the outcome of these measurements with fixed/dynamic thresholds or with the measurements realized on the broadcast channel of other base stations. Eventually, based on this criterion, the Radio Network Controller (Controller of the base stations) or the mobile terminal selects the base stations to be part of the mobile's active set, i.e. the base stations with which the mobile is simultaneously communicating. The active set contains preferably at least two or three base stations because the quality of the communications can change very rapidly and the active set is changed on a much lower basis.

However, with downlink-oriented handover criteria, situations can occur where uplink macrodiversity is wrongly unused (and therefore interference could be further minimized) because the handover criterion has not detected the need for macrodiversity in the uplink. Such a situation occurs when a base station that was not selected in the active set receives signals from a mobile terminal with a better quality than the base stations that are already in the active set. Since the uplink transmission path is not taken in consideration for building the active set, such a base station cannot be put in the active set, although the power of the signals sent by the mobile terminal could have been lowered.

SUMMARY OF THE INVENTION

A particular object of the invention is to mitigate those drawbacks of the state of the art.

More precisely, an object of the invention is to provide a method ensuring that at least the base station requiring the lowest output power from the mobile terminal is put in the active set of this mobile terminal.

This object is obtained in accordance with the invention by a method of selecting a base station of a CDMA type network with which a terminal is to perform a soft handover, the method comprising selecting the base station which requires the lowest transmission power on the part of the terminal.

In another aspect, the invention comprises a method of selecting base stations in a CDMA type network with which a terminal is to provide communication simultaneously, the selection being performed according to a criterion which takes account of the transmission power required of the terminal for the attention of said base stations.

According to a yet further aspect of the invention, there is provided a method of selecting base stations in a CDMA type network with which a terminal is to provide communication simultaneously, the method being characterized in that it comprises: determining which base station of said network benefits from the best propagation conditions in the uplink direction; and selecting the base station to communicate therewith.

According to a still further aspect of the invention, there is provided a method of managing the active set of a terminal operating in a CDMA type transmission network, the method being characterized in that it comprises: determining, for each communication with a candidate base station, the transmission power required in the uplink direction; and selecting the base station for which the corresponding transmission power required in the uplink direction is lower than a threshold value plus the power allocated by said terminal to communication in progress with another base station.

The invention also includes a device for selecting a base station of a CDMA type network with which a terminal is to perform a soft handover, said device comprising means for selecting the base station which requires the lowest transmission power on the part of said terminal.

DETAILED DESCRIPTION OF THE INVENTION

In the following, the invention will be described in closer detail by illustrating several embodiments.

The basic idea of the invention is to supplement an uplink-oriented handover criterion to be possibly combined with known downlink-based criteria, so that the needs of each direction can be fulfilled independently. An optimal uplink soft handover criterion, derived from a generalized open-loop power control procedure, is introduced.

More precisely, in order to reduce interference in the uplink, it is desirable that the most favorable link (in terms of required transmit power) controls the transmit power of the mobile. This is normally ensured by the fast closed-loop power control procedure, provided that all relevant base stations for macrodiversity actually belong to the active set. This power control procedure includes sending to the mobile terminal instructions to increase or to lower its transmission power, on the basis of the quality of the signal sent by this mobile terminal and received by the base station of the active set. This means that all the base stations of the active set send instructions to the mobile terminal, these instructions being related to the output power required from the terminal. The terminal listens to these instructions and modifies its output power such that its output power corresponds to the lowest power requested by the base stations of the active set, so that at least one base station of the active set receives the signals sent by the terminal with a good quality. This ensures that the terminal always sends signals with the lowest possible output power.

The invention therefore includes at least selecting the base station which requires the lowest transmission power on the part of the terminal.

Several implementations of this concept are possible. For example, based on information normally used for open-loop power control, the mobile terminal evaluates the required transmit power towards several "candidate" base stations to achieve the target Eb/I. If one of these power values proves to be close enough to the corresponding required transmit power calculated for base stations of the active set, then the "candidate" base station bearing this low power requirement should be added to the active set, i.e. soft handover should occur with this base.

To put it in a nutshell, the mobile terminal runs several open-loops in parallel with base stations of the active set and the candidate set. The transmit power estimates of the candidate set are compared with those of the active set. In the sequel, this handover scheme is described in more detail.

Calculation of the required transmit power can be realized in the following way: Open-loop power control relies on measurements made over the broadcast channel (e.g. the BCCH) and on the information broadcast on this channel. In each cell, the BCCH periodically sends the following information: required Signal to Interference Ratio at the base, noted $SIR_{req}$, total power measured at the base $P_{r,tot}$, transmit power of the BCCH channel $P_{t,BCCH}$. The broadcast information is periodically updated on a slow basis (about every 100 ms in UTRA-FDD system for CDMA).

For every base station belonging to the candidate set and the active set, the mobile is capable of demodulating the BCCH channel and thus the preceding information is available. In addition, the power received on the BCCH channel of candidate and active (i.e. in communication with the mobile terminal) base stations can be measured. It should be noted that this measurement is already needed to perform conventional downlink-driven soft handover. The power received on the BCCH channel is averaged over such a period that fast-fading effects are removed while slow-fading effects are still accounted for.

As a result, the required transmit power $P_{r,UL}$ to achieve target SIR vis-a-vis an active or candidate base (if the mobile were in communication with it) is evaluated as follows:

$$P_{r,UL} = (SIR_{req} * P_{r,tot} * P_{t,BCCH}) / (PG * P_{r,BCCH}) \quad (1)$$

where PG denotes the processing gain for the said communication (i.e. the ratio between the spreading bandwidth and the bit rate), $P_{r,tot}$ embodies uplink cell loading information and the ratio $P_{t,BCCH}/P_{r,BCCH}$ the pathloss (with $P_{r,BCCH}$ the received power of the BCCH channel). Uplink cell loading conditions depend essentially on the number of users in the cell while downlink cell loading is highly dependent on mobiles' positions. Since uplink and downlink loading conditions do not generally coincide, there is a clear need for distinct uplink and downlink handover criteria.

In a preferred embodiment, the selection of the base station requiring the lowest transmission power on the part of the terminal includes:
  determining, for each communication with a candidate base station, the transmission power required in the uplink direction; and
  selecting the base station for which the corresponding transmission power required in the uplink direction is lower than a threshold value plus the power allocated by said terminal to communication in progress with another base station. This threshold value corresponds to a margin meant to avoid the well known pingpong effect.

The suppression of a base station in the active set of the terminal can be realized when this base station requires uplink transmission power that is greater than that of a candidate base station minus a threshold value. The threshold value can be null. This corresponds to the situation where the maximum size of the active set is reached, and the suppressed base station is to be replaced by a candidate base station. Removal of a base station from the active set can also occur when this base station requires uplink transmission power that is greater than that of an active base station plus a threshold value.

A simplified embodiment of an uplink-based decision algorithm for soft handover is provided hereafter.
  Determine best (resp. worst) active cell as the one with the lowest (resp. highest) $P_{t,UL}$, say $P_{t,best}$ (respectively $P_{t,worst}$)
  For each cell in the candidate set,
    IF ($P_{t,cand} < P_{t,best} + M_{enter}$)
    THEN
      IF (active set size not exceeded)
      THEN candidate cell enters active set
      ELSEIF (($P_{t,cand} < P_{t,worst} - M_{repl}$)
      THEN candidate cell replaces worst cell in active set
    if ($P_{t,act} > P_{t,best} + M_{exit}$) then remove active cell from active set
    where:
    $P_{t,act}$: required transmit power for one of the active base stations
    $M_{enter}$: hysteresis margin for entering the active set
    $M_{repl}$: hysteresis margin for replacing a base station in the active set
    $M_{exit}$: hysteresis margin for removing a base station from the active set The decision to put a base station in the active set of the terminal can be taken at the level of the terminal or at the level of the controller of the base stations (RNC). More precisely, in case of mobile-assisted handover, the decision algorithm is to be implemented in both the mobile and the RNC: the mobile detects potential changes in the active set, but it is up to the RNC to make the final decision of modifying the active set. RNC decisions are based on BCCH power measurements reported by the mobile to the RNC. Using $P_{r,BCCH}$ values, the RNC can readily reconstitute $P_{t,UL}$ values according to relation (1), and apply the preceding decision algorithm.

An alternative embodiment of the solution where evaluation of $P_{t,UL}$ is carried out solely in the RNC could also be envisaged (RNC-evaluated/RNC-executed handover strategy). The chosen handover strategy is assumed to be the same for up- and downlink.

Concerning a combination of uplink and downlink handover criteria, the invention includes the following. Since disjoint handover (independent execution of uplink and downlink handover) is impractical because of closed-loop power control constraints, one must find an appropriate combination of up- and downlink handover criteria. From the uplink viewpoint, augmenting the active set can only help decrease mobile transmit power, without any further penalty for the system. However, in the downlink, augmenting the active set implies sending more signals, which causes in principle more interference. Nevertheless, this negative effect can be largely suppressed if efficient power distribution techniques are used. For example, one can add a base station to the active set to help reduce uplink interference, and assign a very low power fraction to this base (a minimum is required for the signaling part to enable the transmission of power control commands) in the downlink, if no significant advantage is to be expected from the use of this base in the downlink.

In this context, if either of uplink/downlink criteria for addition is verified, the active set should be augmented. On the contrary, when it comes to removing/replacing a base station, more restrictive criteria should be used: The decision is taken if both uplink and downlink conditions are satisfied. As a conclusion, the following combination scheme can be implemented:

logical OR for "add" operation, logical AND for "remove"/"replace" operations.

The present invention also concerns a device for selecting a base station of a CDMA type network with which a terminal is to perform a soft handover, said device comprising means for selecting the base station which requires the lowest transmission power on the part of said terminal. Such a device can be located at the level of the terminal or at the level of the controller of the base stations.

As compared to existing solutions, the invention presents the following benefits:

improved uplink interference management: thanks to the invention, uplink interference is reduced (+load balancing effect), resulting in an uplink capacity increase;

increased flexibility in cell transition handling: optimal uplink criterion and customized downlink criterion (instead of neutral pathloss-based handover criterion), leading as well to a gain in downlink interference management;

no additional reporting from mobile to network: using reports of BCCH received power measurements, the RNC can infer $P_{t,UL}$ values;

possible extensions to disjoint handover and emergency power regulation.

The present invention can be applied to several cellular or trunked mobile communication system, such as the Pan-European mobile communication system GSM, DCS1800 (Digital Communication System), PCN (Personal Communication Network), UMC (Universal Mobile Communication), UMTS (Universal Mobile Telecommunication System), FPLMTS (Future Public Land Mobile Telecommunication System), etc.

What is claimed is:

1. A method, comprising:

selecting a first base station of a CDMA type network with which a terminal is to perform a soft handover, wherein, before selecting said first base station, said first base station is not included in an active set of said terminal; and wherein said first base station, in order to obtain a required signal-to-interference ratio at said first base station, requires a first transmission power from said terminal that is lower than a respective second transmission power from any second base station that is, before selecting said first base station, included in said active set of said terminal;

determining a respective third transmission power for each communication with a candidate base station in an uplink direction; and selecting a third base station for which the respective third transmission power is lower than a threshold value plus a power allocated by said terminal to communication in progress with a fourth base station.

2. The method according to claim 1, further comprising selecting a third base station whose signals transmitted to said terminal are received by said terminal with the best quality.

3. The method according to claim 1, wherein said method is implemented in said terminal.

4. The method according to claim 1, wherein said method is implemented in a respective controller of said first base station and said second base station.

5. A method of selecting base stations in a CDMA type network with which a terminal is to provide communication simultaneously, said selection being performed according to a criterion, wherein said criterion takes account of a transmission power in an uplink direction, which is required of said terminal in order to obtain a required signal-to-interference ratio at said base stations; and wherein the transmission power required of said terminal in the uplink direction is lower than a threshold value plus a power allocated by said terminal to communication in progress with a base station other than said base stations.

6. A method of selecting base stations in a CDMA type network with which a terminal is to provide communication simultaneously, comprising:

determining a specific base station of said base stations that benefits from the best propagation conditions in an uplink direction; and selecting said specific base station to communicate with said terminal, wherein a corresponding transmission power of said terminal required in the uplink direction is lower than a threshold value plus a power allocated by said terminal to communication in progress with a base station other than the specific base station.

7. A method of managing an active set of a terminal operating in a CDMA type transmission network, comprising:

determining, for each communication with a respective candidate base station, a respective transmission power required in an uplink direction; and selecting a first base station for which the respective transmission power required in the uplink direction is lower than a threshold value plus a power allocated by said terminal to communication in progress with a second base station.

8. The method according to claim 7, further comprising eliminating from the active set a third base station requiring a first uplink transmission power that is greater than a second uplink transmission power of the respective candidate base station minus a threshold value.

9. A device, comprising:
   a first selection arrangement for selecting a first base station of a CDMA type network with which a terminal is to perform a soft handover,
      wherein, before selecting said first base station, said first base station is not included in an active set of said terminal; and
      wherein said first base station, in order to obtain a required signal-to-interference-ratio at said first base station, requires a first transmission power from said terminal that is lower than a respective second transmission power from any second base station that is, before selecting said first base station, included in said active set of said terminal;
   a determination arrangement for determining a respective third transmission power for each communication with a candidate base station in an uplink direction; and
   a second selection arrangement for selecting a third base station for which the respective third transmission power is lower than a threshold value plus a power allocated by said terminal to communication in progress with a fourth base station.

10. A device according to claim 9, characterized in that said device is comprised in said terminal.

11. A device according to claim 9, characterized in that said device it comprised in the controller of said base stations.

12. A method for performing soft-handover in a CDMA type network, which comprises a plurality of base stations, comprising:
   broadcasting a respective broadcast signal from a respective base station of the plurality of base stations to at least one terminal;
   measuring an intensity of the respective broadcast signal at the terminal;
   determining at least one of a respective target signal-to-interference ratio and a respective target Eb/I ratio required by the respective base station;
   evaluating a respective uplink transmission power level to be transmitted by the terminal to the respective base station to meet the respective target signal-to-interference ratio required by the respective base station, wherein the respective uplink transmission power level depends on the measured intensity of the respective broadcast signal, on a total power received at the respective base station, on a power with which the respective base station broadcasts the respective broadcast signal, and on the at least one of the respective target signal-to-interference ratio and the respective target Eb/I ratio;
   selecting a first base station that is, before selection, not included in an active set of the terminal and that requires a first uplink transmission power level that is lower than a second uplink transmission power level required by any second base station that is, before selecting the first base station, included in the active set of the terminal; and
   performing the soft-handover with the first base station.

13. The method according to claim 12, wherein the method is implemented in the terminal; and wherein the respective broadcast signal comprises the at least one of the respective target signal-to-interference ratio and the respective target Eb/I ratio required by the respective base station, the power with which the respective base station broadcasts the respective broadcast signal, and the total power received at the respective base station.

14. A device for performing soft-handover in a CDMA type network, wherein the CDMA type network comprises a plurality of base stations, the device comprising:
   a receiver at a terminal to receive an indication relating to an intensity of a respective broadcast signal broadcasted from a respective base station of the plurality of base stations to the terminal;
   a determination arrangement to determine at least one of a respective target signal-to-interference ration and a respective target Eb/I ratio required by the respective base station;
   an evaluation arrangement to evaluate a respective uplink transmission power level to be transmitted by the terminal to the respective base station to meet the respective target signal-to-interference ratio required by the respective base station, wherein the respective uplink transmission power level depends on a measured intensity of the respective broadcast signal, on a total power received at the respective base station, on a power with which the respective base station broadcasts the respective broadcast signal, and on the at least one of the respective target signal-to-interference ratio and the respective target Eb/I ratio;
   a selector to select a first base station that is, before selection, not included in an active set of the terminal and that requires a first uplink transmission power level that is lower than a second uplink transmission power level required by any second base station that is, before selecting the first base station, included in the active set of the terminal; and
   an arrangement for performing the soft-handover with the first base station.

* * * * *